Figure 1:
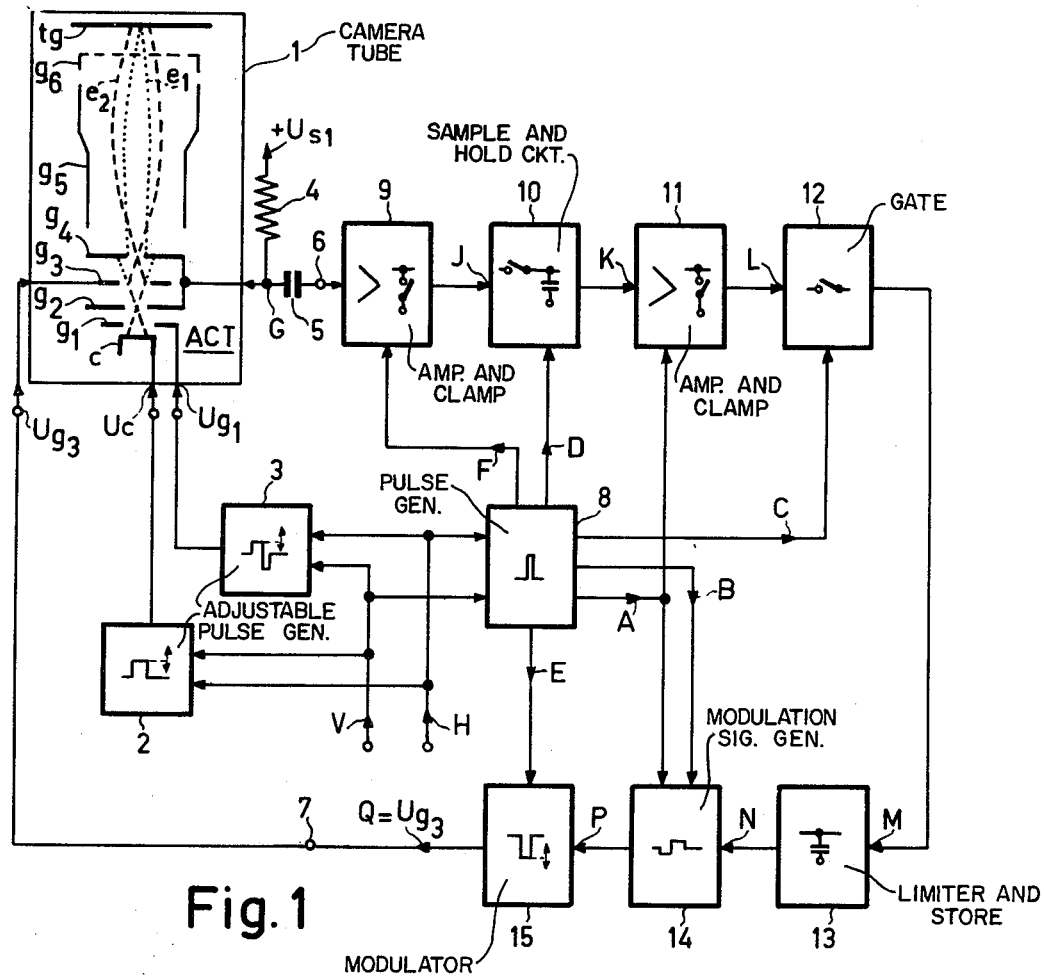

358-218.    OR    3,931,466    SR

United States [19]
Van Den Berg

[11]    3,931,466
[45]    Jan. 6, 1976

[54] CIRCUIT ARRANGEMENT FOR USE IN A TELEVISION CAMERA TUBE WITH AN ANTI-COMET TAIL ELECTRON GUN

[75] Inventor: Wouter Van Den Berg, Eindhoven, Netherlands

[73] Assignee: U.S. Philips Corporation, N.Y., N.Y.

[22] Filed: Mar. 8, 1974

[21] Appl. No.: 449,354

[30]    Foreign Application Priority Data
Mar. 13, 1973    Netherlands .................... 7303466

[52] U.S. Cl. .......................... 178/7.2; 178/DIG. 29
[51] Int. Cl.² ......................................... H04N 5/34
[58] Field of Search .................... 178/7.2, DIG. 29; 315/31 R, 31 TV

[56]    References Cited
UNITED STATES PATENTS

| | | | |
|---|---|---|---|
| 3,392,236 | 7/1968 | Nielsen et al. ............... | 178/DIG. 29 |
| 3,548,250 | 12/1970 | Van Roosmalen et al. ..... | 313/448 X |
| 3,602,642 | 8/1971 | Van Den Auoort et al. | 178/DIG. 29 |
| 3,610,823 | 10/1971 | Haenen et al. ............... | 178/DIG. 29 |
| 3,708,617 | 1/1973 | Caraba et al. ................ | 178/7.2 |
| 3,764,923 | 10/1973 | Woodworth et al. ......... | 178/DIG. 29 |

*Primary Examiner*—Robert L. Griffin
*Assistant Examiner*—Mitchell Saffian
*Attorney, Agent, or Firm*—Frank R. Trifari; Henry I. Steckler

[57]    ABSTRACT

An automatic control to the optimum lens adjustment in an ACT gun in a television camera tube. A variation in the cathode and control electrode potential during the line flyback requires an adaptation of the lens voltage for optimum target erasing action. In the circuit a measurement of the anode current in the gun is effected because for an optimum target erasing action during the line flyback it is found that this current must be at a minimum. A measurement is effected about an adjusting point. In case of unequal current the optimum value is not yet reached and an adjusting point displacement is effected towards the optimum value whereafter a subsequent measurement is effected.

19 Claims, 4 Drawing Figures

CIRCUIT ARRANGEMENT FOR USE IN A TELEVISION CAMERA TUBE WITH AN ANTI-COMET TAIL ELECTRON GUN

The invention relates to a circuit arrangement suitable for use in a television camera tube provided with an anti-comet tail electron gun. The gun has a cathode, a control electrode, anode electrodes and a lens electrode for generating during line scan times and line flyback times an electron beam having different values for beam diameter, beam current intensity and potential upon impact of a target plate present in the tube. A line period is constituted by the line scan time and a line blanking time comprising the line flyback time and a beam blanking time.

A television camera tube formed with such an electron gun is described in U.S. Pat. No. 3,548,250. The gun limits the originally linearly varying pick-up characteristic between light incident on the target plate from a scene to be picked up and the picture signal generated by the camera tube because the pick-up characteristic gets a substantially flat curve after a knee level. Without the use of the gun a locally excessive exposure of the target plate would have the result that the potential image corresponding to the scene cannot locally be neutralised by the scanning electron beam during the line scan time, i.e. the line sweep. The non-neutralised remaining charge causes loss of contrast upon display. A displacement of the locally excessive exposure on the target plate results in a comet tail upon display.

The anti-comet tail electron gun generates an electron beam in a line flyback time preceding a line sweep which beam scans the target plate with an instantaneously larger beam diameter and beam current intensity. The cathode potential is then instantaneously increased and consequently the potential of the electron beam at the landing spot on the target plate. The increase of the cathode potential determines the knee level in the pick-up characteristic because a still higher potential in the potential image on the target plate obtained by locally excessive exposure is reduced to the less increased beam potential before the normal line scan during the sweep.

The charge neutralisation on the target plate taking place during the line flyback time requires a determined voltage between the cathode and the control electrode for fixing the required beam current intensity, while a desired cathode potential is present for fixing the said knee level in the pick-up characteristic, as well as a determined voltage between the lens electrode and the anode electrodes present on both sides thereof. The lens voltage determines the beam current intensity and diameter at the target plate because beam nodes in the generated electron beam are formed near the anode electrode. An adjustment, displacement or variation in one of the potentials on the cathode, the control electrode and the lens electrode requires an adaptation of the two other potentials for obtaining an optimum charge neutralisation during the line flyback time. Ageing phenomena in the camera tube cause, for example, such a variation. Due to mutual influences the adjustment of an optimum charge neutralisation is a difficult and time-consuming matter and requires skill.

The invention has for its object to provide a circuit arrangement with which an optimum charge neutralisation is obtained automatically in a camera tube formed with an anti-comet tail electron gun. To this end the circuit arrangement according to the invention is characterized in that it is provided with an input for connection to an anode electrode present in the camera tube. A measuring circuit for taking a sampling signal during the line flyback time is connected, to the input. The measuring circuit is formed with a comparison circuit for holding a taken sampling signal and for comparing two successively held sampling signals. A control circuit is connected to the comparison circuit in the measuring circuit and has an output for connection to the lens electrode in the camera tube. Said control circuit provides a changed lens adjustment during the line flyback time in case of unequal sampling signals in the comparison circuit for the purpose of eliminating the inequality.

Figure 3:
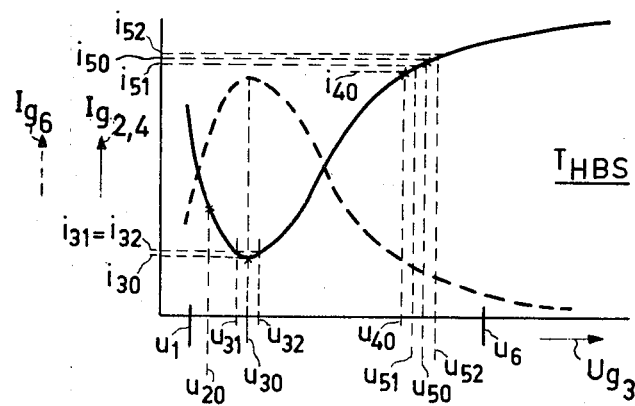
Figure 2:
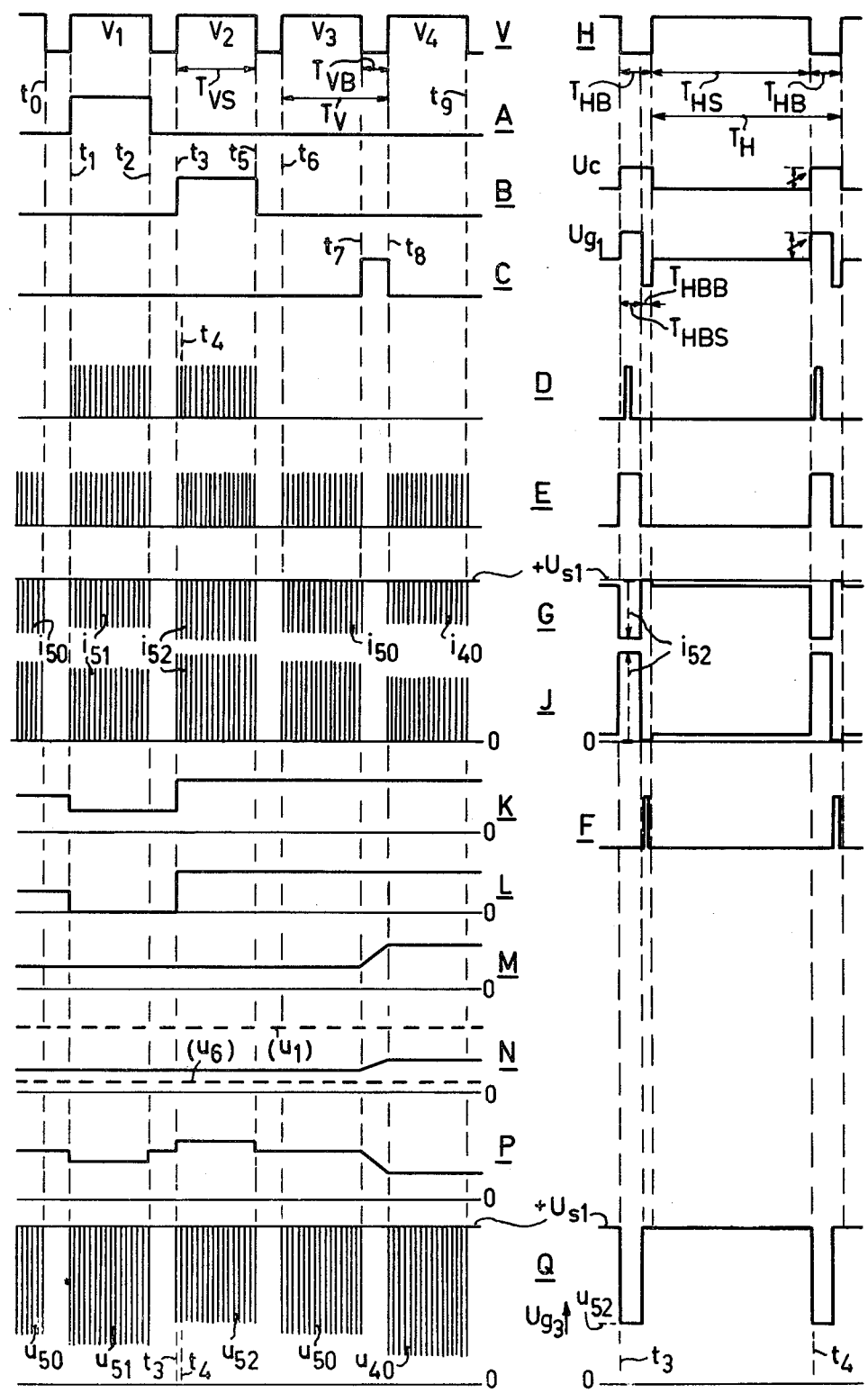
Figure 4:
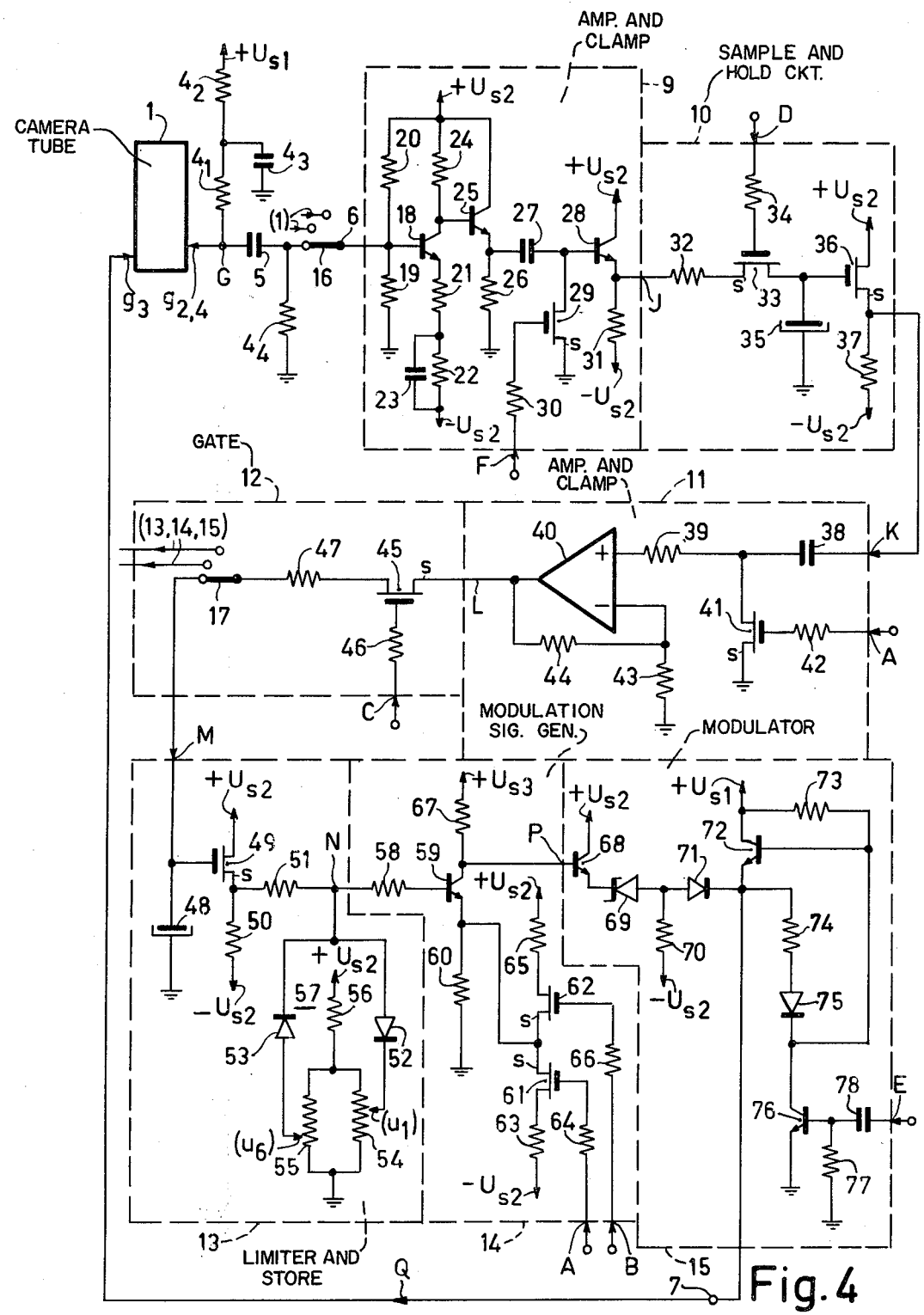

The invention will be described in greater detail by way of example with reference to the following figures in which FIG. 1 shows the circuit arrangement according to the invention in a block schematic diagram;

FIG. 2 shows some signals occurring in the circuit arrangement according to FIG. 1, FIG. 3 shows two current-voltage characteristics and FIG. 4 shows the circuit arrangement according to FIG. 1 in detail.

In FIG. 1, 1 denotes a television camera tube and 2 and 3 are two adjustable pulse generators connected thereto. Control signals V and H are applied to the generators 2 and 3 which signals are plotted on two different time scales in FIG. 2. Some successively occurring instants are denoted by $t_0, t_1 \ldots t_9$. The signal V is associated with the field scan commonly used in television and in FIG. 2, the reference $T_V$ shows a periodically occurring field period which consists of a field scan time $T_{VS}$ and a field blanking time $T_{VB}$. The references $V_1$, $V_2$, $V_3$ and $V_4$ denote four successive field periods in the signal V. The signal H is associated with the line scan and in FIG. 2 the reference $T_H$ denotes a periodically occurring line period which consists of a line scan time $T_{HS}$ and a line blanking time $T_{HB}$. The time scale of the signal H is plotted for the instants $t_3$ and $t_4$ shown at the signal V. The values of the signals shown in FIG. 2 are not shown to scale.

The respective pulse generators 2 and 3 apply to the camera tube 1 of FIG. 1 signals Uc and $U_{g_1}$ which are plotted on the line time scale of the signal H in FIG. 2. In FIG. 2 the line blanking time $T_{HB}$ at the signal $U_{g_1}$ is subdivided in a line flyback time $T_{HBS}$ and a beam blanking time $T_{HBB}$. The line blanking time $T_{HB}$ and the line scan time $T_{HS}$ are fixed in accordance with a television standard, but may slightly deviate therefrom in the circuit arrangement according to FIG. 1 as is common practice in television pick-up apparatus in which, for example, a line control signal H is used with a negative going pulse of 11 $\mu s$ which falls within the standard line blanking time of 12 $\mu s$. For the simplicity of the description these differences between the television standard and commonly used times in pick-up apparatus are not further considered. Likewise time differences which are irrelevant to the invention may occur between simultaneously occurring pulse edges drawn in FIG. 2.

In the camera tube 1 according to FIG. 1 some components are diagrammatically shown and the connection of some of them to the exterior of the tube 1 are shown in so far as they are important for understanding the invention. Deflection coils, a focussing coil, etcetera (not shown) provided outside the tube 1 are essential for the operation but they are of lesser importance for explaining the invention and have therefor been omitted. The camera tube 1 is provided with successively: a cathode $c$, a control electrode $g_1$, a first anode electrode $g_2$, a lens electrode $g_3$, a second anode electrode $g_4$ connected to the first, a collector anode electrode $g_5$, a grid anode electrode $g_6$ and a target plate $t_g$. The cathode $c$ and the electrodes $g_1$, $g_2$, $g_3$ and $g_4$, constitute an electron gun ACT which can be characterized by its given structure ($c, g_1 \ldots g_4$) as an anti-comet tail electron gun. The supply of the composite anode electrode $g_{2,4}$ is effected through a resistor 4 from a terminal carrying a voltage $+U_{S1}$; which terminal forms part of a supply source $U_{S1}$ another terminal (not shown) of which is connected to ground as also applies for other supply voltages to be referred to. Furthermore the anode electrode $g_{2,4}$ is connected through a capacitor 5 to an input 6 of the circuit arrangement according to the invention which is provided with an output 7 connected to the lens electrode $g_3$. The circuit (6, 7) provides the signal $Q = Ug_3$ through the output 7 in a manner to be described hereinafter which signal is plotted both on the time scale of the signal H and on that of the signal V in FIG. 2. The signal Q of FIG. 2 shows that outside the line flyback time $T_{HBS}$ the voltage $+U_{S1}$ is impressed on the lens electrode $g_3$ while a negative going pulse occurs thereacross during the line flyback time $T_{HBS}$ to a much lower positive voltage.

To explain the operation of the anti-comet tail gun ACT it is sufficient to consider the signals $Uc$, $Ug_1$ and $Ug_3$ in which the anode electrode $g_{2,4}$ carries the voltage $+U_{S1}$. During the line scan time $T_{HS}$ i.e. the line sweep the voltage on the lens electrode $g_3$ is equal to that on the anode electrode $g_{2,4}$ ($+U_{s1}$) while the cathode is, for example, at the ground potential of 0 volt and the control electrode $g_1$ has such a large negative voltage that an electron beam is generated which is denoted by $e_1$ in the camera tube 1. The beam $e_1$ focussed in the correct manner on the target plate $tg$ scans this plate by means of deflection means and a potential image present thereon is neutralised thereby, that is to say, the target plate $tg$ is brought to the ground potential in the landing spot of the electron beam. The potential image is obtained by projecting the light from a scene onto the target plate $tg$ which is constituted by a transparent electrically conducting signal plate connected through a resistor to a voltage source and by a semiconductor coating, so that the photons of the light reduce the local leakage resistance of the semiconductor coating. The image signal generated by the tube 1 is derived from the signal plate of of the target plate $tg$.

During the line blanking time $T_{HB}$ the camera tube 1 does not generate a picture signal for further processing and display on a display device. Normally the voltage on the control electrode $g_1$ has been rendered so far negative that the gun does not generate an electron beam. According to the anti-comet tail principle, however, the gun ACT does generate an electron beam during part of the normal line blanking time $T_{HB}$, which beam is denoted by $e_2$ in FIG. 1. Only during the beam blanking time $T_{HBB}$ is the electron beam suppressed. During the line flyback time $T_{HBS}$ the voltage ($Ug_1$) on the control electrode $g_1$ is rendered so little negative that the current intensity of the beam $e_2$ may be some hundreds of times larger than that of the beam $e_1$; the lens electrode $g_3$ then serves its purpose by providing a beam node in the electron beam in the apertures in the anode electrodes $g_2$ and $g_4$. The small positive voltage in the line flyback time $T_{HBS}$ on the lens electrode $g_3$ determines the position of the beam nodes relative to the anode electrodes $g_2$ and $g_4$ with the high positive voltage $U_{S1}$. The beams $e_1$ and $e_2$ shown in FIG. 1 show the influence of the lens electrode $g_3$. In order to avoid that the beam $e_2$ with the larger diameter and current intensity occurring during the line flyback erases the desired information on the target plate $tg$ it is essential that during the flyback time $T_{HBS}$ the cathode $c$ lies at a chosen adjusted positive potential. The increased cathode potential determines the potential of the electron beam landing spot on the target plate $tg$ and the potential image will be neutralised to this potential. The desired information in the potential image occurring between the ground potential and the increased cathode potential is not influenced during the line flyback time $T_{HBS}$. Before a television line is read during a line scan time $T_{HS}$ an optionally present excessively high potential in the potential image on the target plate $tg$ is removed by means of the gun ACT so that the pick-up characteristic between incident light and the picture signal generated by the camera tube 1 does not further change linearly but gets a knee towards a substantially flat path.

An optimum erasing action during the line flyback time $T_{HBS}$ on the target plate $tg$ is dependent on the position of the beam nodes in the electron beam $e_2$ and hence on the voltage between the lens electrode $g_3$ and the anode electrodes $g_2$ and $g_4$. The beam node positions are likewise determined by the increased positive potential on the cathode $c$ and by the voltage between the cathode $c$ and the control electrode $g_1$. In case of a variation which is caused, for example, by ageing phenomena, a displacement of adjustment of a potential on the cathode $c$, the control electrode $g_1$ or the lens electrode $g_3$ it is found in practice that the two other potentials are to be adapted for optimum erasing. Due to the mutual dependency the optimum adjustment for erasing is difficult to achieve.

The circuit arrangement 6, 7 according to FIG. 1 automatically gives the optimum adjustment for erasing during the line flyback time $T_{HBS}$ at any displacement of variation in the potential on the cathode $c$ (displacement of the knee level in the pick-up characteristic) or on the control electrode $g_1$ (adaptation to scene circumstances of the maximum possible current intensity in the electron beam $e_2$ for erasing). FIG. 2 shows the adjustable and changeable potentials in the signals or voltages $Uc$ and $Ug_1$ by means of an arrow. For explanation reference is made to FIG. 3 which shows two characteristics $Ig_6$ and $Ig_{2,4}$ as a function of the voltage $Ug_3$ which characteristics apply during the line flyback time $T_{HBS}$. For the current-voltage characteristics some values $u_{20}$, $u_{30}$, $u_{31}$, $u_{32}$ etc. are shown between a minimum value $u_1$ and a maximum value $u_6$ of the voltage $Ug_3$ while some current values are denoted by $i_{30}$, $i_{31}$, $i_{32}$, $i_{50}$, $i_{51}$ and $i_{52}$. According to one aspect the optimum erasing action is found to be coinciding with a minimum current in the composite anode electrode $g_{2,4}$ and with a maximum current in the grid anode electrode $g_6$. FIG. 3 shows that for the voltage $Ug_3$ equal to $u_{30}$ the minimum and maximum values occur in the currents $Ig_{2,4}$ and $Ig_6$, respectively. For the characteristic $Ig_{2,4}$ there follows an optimum erasing adjusting point $u_{30}$, $i_{30}$. The current-voltage characteristics shown in FIG. 3 have as a parameter the value occurring during the line flyback time $T_{HBS}$ of the voltage Uc on the cathode c shown in FIG. 2 and the voltage $Ug_1$ on the control electrode $g_1$. For the description of the circuit arrangement 6,7 according to FIG. 1 displacement in the voltages Uc and $Ug_1$ during the line flyback time $T_{HBS}$ to a value with which the current-voltage characteristic according to FIG. 3 is associated is used as a starting point, while without the steps of the invention a voltage $Ug_3$ equal to $u_{50}$ occurs on the lens electrode $g_3$ during the line flyback times $T_{HBS}$; the erasing action is not optimum in this case. In FIG. 2 the signal Q includes during the field scan time $T_{VS}$ before the first field period $V_1$ (before the instant $t_0$) the pulses going from the voltage $+U_{S1}$ to the voltage $u_{50}$ which pulses occur at the output 7 during the line flybacks $T_{HBS}$. FIG. 3 shows that for the voltage $u_{50}$ a current $I_{g2,4}$ equal to $i_{50}$ occurs. The current $I_{g2,4}(=i_{50})$ flows through the resistor 4 of FIG. 1 so that a signal G with negative going pulses ($i_{50}$) shown in FIG. 2 occurs at the junction of the resistor 4 and the anode electrode $g_{2,4}$. The signal G will be described in greater detail.

For generating the various signals shown in FIG. 2 the circuit arrangement of FIG. 1 is provided with a pulse generator 8 to which the control signals V and H are applied. The pulse generator 8 generates signals A and B shown in FIG. 2 with a pulse during the field scan time $T_{VS}$ in the field periods $V_1$ and $V_2$, respectively. A generated signal C has a pulse during the field blanking time $T_{VB}$ of the field period $V_3$. A signal D has pulses occurring during the field scan times of the field periods $V_1$ and $V_2$ during the line flyback times $T_{HBS}$. The pulses in the signal D having a duration which is shorter than the line flyback time $T_{HBS}$ will be found to be active as sampling pulses. A signal E has pulses occurring during the field scan times $T_{VS}$ with a duration which is equal to and is located in the line flyback times $T_{HBS}$ while a signal F likewise has pulses with a duration shorter than and located in the beam blanking times $T_{HBB}$. The pulses in the signal F will be found to be active as clamping pulses. The pulse generator 8 may be formed with digital components, the embodiment is left out of consideration.

The signal G to be measured of FIG. 2 is applied through the capacitor 5 to the input 6 in FIG. 1 and passed on to an amplifier and clamping circuit 9 to which furthermore the pulse generator 8 applies the signal F with the clamping pulses. The circuit 9 derives from the signal G a signal J and passes it on to a sample-and-hold circuit 10 which receives the signal D with the sampling pulses. The circuit 10 applies a sampling signal K to an amplifier and clamping circuit 11 to which the signal A active with a clamping pulse is applied. The circuit 11 applies a difference signal L to a gating circuit 12 to which the signal C with a gating pulse is applied. The gating circuit 12 is connected to the input of a storage circuit including a limiter 13 at which input a storage signal M occurs. The circuit 13 applies an adjusting signal N to a modulation signal generator 14 to which furthermore the signals A and B with modulation pulses are applied. The generator 14 applies a modulation signal P to a modulator 15 to which the signal E with the pulses to be modulated is applied. The pulse modulator 15 applies the signal Q shown in FIG. 2 to the output 7 for supply to the lens electrode $g_3$ of the camera tube 1 of FIG. 1.

Considering the operation, the measuring and control circuit 6–15 according to FIG. 1 consists of a measuring circuit 9, 10, 11 and a control circuit 13, 14 15 which are coupled together through the gating circuit 12. A comparison circuit 10, 11 is present in the measuring circuit 9, 10, 11.

To explain the operation of the circuit arrangement of FIG. 1 the starting point is the signal Q as is supplied during the field periods $V_1$, $V_2$ and $V_3$ by the modulator 15 under the control of the modulation signal generator 14. During the field scan time $T_{VS}$ of the field period $V_3$ the modulation signal P has a value which is equal to that for the instant $t_0$ and negative going pulses occur in the signal Q with a voltage $u_{50}$. The pulse occurring in signal A between the instants $t_1$ and $t_2$ instantaneously reduces the value in the modulation signal P determined by the adjusting signal N while the pulse occurring in the signal B instantaneously increases the signal value between the instants $t_3$ and $t_5$. In correspondence thereto the pulses in the signal Q have a lower or higher voltage $u_{51}$ and $u_{52}$. FIG. 3 shows that for the pulses having the lower voltage $u_{51}$ and higher voltage $u_{52}$ a smaller current $i_{51}$ and a higher current $i_{52}$, respectively, flow through the resistor 4 of FIG. 1. In FIG. 2 the currents $i_{50}$, $i_{51}$ and $i_{52}$ are shown for the signal G as they correspond to the voltage drop across the resistor 4. The signal G at the instants $t_3$ and $t_4$ is shown in detail on the line time scale. The resistor 4 is without current during the beam blanking time $T_{HBB}$ so that the voltage $+U_{S1}$ occurs in the signal G. In the line flyback time $T_{HBS}$ shown the pulse whose height corresponds to the current $i_{52}$ occurs as from the voltage $+U_{S1}$. During the line scan time $T_{HS}$ only a small current flows through the resistor 4 because the current intensity of the beam $e_1$ of FIG. 1 is less than one hundredth of that of the beam $e_2$ occurring during the line flyback line $T_{HBS}$. In this case there applies that, considered relatively, a larger part of the total number of electrons emitted by the cathode c remains in the gun ACT during a line scan time $T_{HS}$ than during the line flyback time $T_{HBS}$. However, since during the line flyback time $T_{HBS}$ the cathode c emits a number of electrons which is some hundredths of times larger than in the line scan time $T_{HS}$, the voltage drop in the signal G is likewise several hundredth times larger. To illustrate this there applies that for a beam current ($e_1$) of 500 nA during the line scan time $T_{HS}$ a current of 3 $\mu$A may flow through the resistor 4 while this may be 300 $\mu$A for a beam current ($e_2$) of 150 $\mu$A during the line flyback time $T_{HBS}$.

In the amplifier and clamping circuit 9 the clamping pulses in the signal F during the beam blanking time $T_{HBB}$ give the ground potential of 0 volt in the signal J. Positive going amplified pulses occur in the signal J whose heights correspond to the said currents $i_{50}$, $i_{51}$ and $i_{52}$. The sampling signal K is derived from the signal J with the aid of the sampling pulses in the signal D applied to the sample-and-hold circuit 10. A positive voltage which corresponds to the current $i_{51}$ is measured between the instants $t_1$ and $t_2$ in the circuit 10 while as from the instant $t_3$ to the instant $t_5$ a higher positive voltage is measured corresponding to the current $i_{52}$. After the instants $t_2$ and $t_5$ the circuit 10 holds the samples taken. The sampling signal K is fixed at the ground potential of 0 volt in the amplifier and clamping circuit 11 by the clamping pulse in the signal A occurring between the instants $t_1$ and $t_2$. The larger positive voltage subsequently occurring in the sampling signal K at the instant $t_3$ gives a positive voltage in the signal L. The (positive) voltage in the signal L is a measure of the difference between the value of the currents $i_{51}$ and $i_{52}$, while the current $i_{52}$ being larger than $i_{51}$ determines the positive polarity of the voltage in the difference signal L. When instead of a larger value for the current $i_{52}$ it had been smaller than that of current $i_{51}$ determined negative voltage occurs in the difference signal L.

The difference signal L supplied by the comparison circuit 10, 11 in the measuring circuit 9, 10, 11 bits with the given positive voltage at the adjusting point $u_{50}$, $i_{50}$ on the characteristic shown in FIG. 3. The adjusting point $u_{50}$, $i_{50}$ considerably deviates from the optimum adjusting point $u_{30}$, $i_{30}$. The difference signal L can be utilised through the gating circuit 12 for a control to the optimum adjusting point $u_{30}$, $i_{30}$. To this end the difference signal L between the instants $t_7$ and $t_8$ is applied through the then open gating circuit 12 to the storage circuit 13 in which a storage capacitor conveys the signal M. The operation of the limiter present in the storage circuit 13 will be described hereinafter, but for now there applies that as from the storage circuit 13 the signal N is applied with the positive going edge shown in FIG. 2 to the modulation signal generator 14 so that as from the instant $t_8$ the voltage in the modulation signal P is decreased. The decreased voltage in the signal P occurring after the instant $t_8$ corresponds through the then occurring pulses in the signal Q to a different adjusting point in the characteristic of FIG. 3 namely, for example, to the adjusting point $u_{40}$, $i_{40}$. It is found that for the increased voltage $u_{40}$ in the pulses of the signal Q a reduced current $i_{40}$ occurs in the signal G. The cycle described with reference to FIG. 2 with the variation by means of the modulation pulses in the signals A and B around the adjusting point $u_{50}$, $i_{50}$ may be effected after the instant $t_9$ for the adjusting point $u_{40}$, $i_{40}$. The instant $t_9$ corresponds, for example, to an instant $t_0$ of a subsequent cycle. The measuring and control circuit 6–15 according to FIG. 1 will be active in the manner as described with reference to FIG. 2 until no positive voltage occurs any longer in the difference signal L. Then there applies that the currents occurring in the signal G between the instants $t_1$ and $t_2$, and $t_3$ and $t_5$ are equal in the then occurring cycle which means that the circuit arrangement according to FIG. 1 is adjusted at the optimum adjusting point $u_{30}$, $i_{30}$ at which for $u_{31}$ and $u_{32}$ there applies that $i_{31} = i_{32}$.

When instead of the erroneous adjusting point with the voltage $u_{50}$ in FIG. 3 a voltage $u_{20}$ is used as a starting point which is lower than the optimum voltage $u_{30}$, a negative voltage occurs in the difference signal L which increases the voltage in the modulation signal P between the instants $t_7$ and $t_8$ so that the pulses in the signal Q are reduced. Here an automatic control towards the optimum adjusting point $u_{30}$, $i_{30}$ occurs too.

For the operation of the circuit arrangement according to FIG. 1 it is irrelevant in which sequence the periodical stepwise variation in the modulation signal P is effected under the control of the modulation pulses in the signals A and B. Instead of the sequence of the voltages $u_{51}$ and $u_{52}$ in the signal Q, the voltages $u_{52}$ and $u_{51}$ may be used.

It has been described with reference to FIG. 2 that during two entire and successively occurring field scan times $T_{VS}$ ($t_1$ to $t_2$ and $t_3$ $t_5$) the signal J is sampled in the circuit 10. This is not required although it is favourable on the one hand for an averaging effect across the field scan times $T_{VS}$ and on the other hand gives the simpler signal comparison in the clamping circuit 11. In fact a signal loss between the field periods $V_1$ and $V_2$ used for the measurement need not be taken into account.

The adaptation of the pulse voltage in the signal Q during a field blanking time $T_{VB}$ by enabling the gating circuit 12 during this time, has the advantage that twenty line periods $T_H$ can be utilized so that the adaptation can be effected without interfering high frequency switching phenomena. An advantageous signal integration can be used for this purpose in a manner to be described with reference to FIG. 4.

In FIG. 2 a cycle is described which lasts four field periods $V_1 \ldots V_4$ between two adjusting point displacements. For the measurement described in FIG. 2 during the two-field scan times $T_{VS}$ and passing on the information during the field blanking time $T_{VB}$ a shortest cycle of two field periods follows when the information is passed on between the instants $t_5$ and $t_6$ and when the instants $t_1$ and $t_6$ periodically coincide.

The circuit arrangement according to FIG. 1 is described for the use of the $Ig_{2,4}$ current characteristic of FIG. 3 in which a minimum current determination ($i_{30}$) gives the optimum erasing adjusting point. When using the $Ig_6$ current characteristic a maximum current determination is to be effected which is more unfavourable than the minimum determination. For the collector-anode electrode $g_5$ in the camera tube 1 an $Ig_5$–$Ug_3$ characteristic can be derived which resembles the $Ig_6$–$ug_3$ characteristic shown in FIG. 3 but with a less defined maximum. Relative to the $Ig_5$–$Ug_3$ characteristic the use of the $Ig_6$–$Ug_3$ characteristic is preferred.

FIG. 4 shows in detail an embodiment of a circuit arrangement according to the invention in which the components and signals already shown in FIGS. 1 and 2 are denoted in the same manner. The composite anode electrode $g_{2,4}$ of the camera tube 1 is connected through a series arrangement of two resistors $4_1$ and $4_2$ to the terminal conveying the voltage +$U_{S1}$. The junction of the resistors $4_1$ and $4_2$ is connected to ground through a high-frequency bypass capacitor $4_3$. The anode electrode $g_{2,4}$ is connected to ground through the capacitor 5 in series with a leakage resistor $4_4$. The coupling capacitor 5 is furthermore connected to a selection contact of a change-over switch 16 whose master contact is connected to the input 6. The change-over switch 16 is shown as an example with three selection contacts and a further camera tube 1 not shown may be connected to any of the other selection contacts, which three camera tubes are incorporated in a colour television camera. The measuring circuit 9, 10, 11 may alternately be connected by means of the change-over switch 16 in a cycle to one of the camera tubes 1 connected to the selection contacts. The gating circuit 12 is formed in FIG. 4 likewise with a change-over switch 17 having three selection contacts each of which is connected to a separate control circuit 13, 14, 15. The three control circuits 13, 14, 15 are each associated with a different camera tube 1 and when they are not connected through the change-over switch 17 the storage circuit 13 retains the relevant camera tube 1 in a previously determined erasing adjusting point. The change-over switches 16 and 17 shown as mechanical switches and switching synchronously may in practice be formed as electrical change-over switches.

The input 6 is connected in the amplifier and clamping circuit 9 to the base electrode of an npn transistor 18 which is connected to ground through resistors 19 and 20 and to a terminal conveying a voltage +$U_{S2}$. The emitter electrode of the transistor 18 is connected through a resistor 21 in series with a parallel arrangement of a resistor 22 and a high-frequency bypass capacitor 23 to a terminal conveying a voltage $-U_{S2}$. The collector electrode of the transistor 18 is connected through a resistor 24 to the terminal conveying a voltage $+U_{S2}$ and is connected to the base electrode of an npn transistor 25 whose collector electrode is connected to the terminal conveying the voltage $+U_{S2}$. The emitter electrode of the emitter follower transistor 25 is connected to ground through a resistor 26 and is connected through a coupling capacitor 27 in the base electrode of an npn transistor 28 and to the drain electrode of a field effect transistor 29 which is formed with an isolated gate electrode. The field effect transistor 29 is of the n-channel type and its source electrode s is connected to ground while the isolated gate electrode is connected through a resistor 30 to a terminal to which the signal F with the clamping pulses according to FIG. 2 is applied. The collector electrode of the emitter follower transistor 28 is connected to the terminal conveying the voltage $+U_{S2}$ and the signal J of FIG. 2 occurs on the emitter electrode connected through a resistor 31 to the terminal conveying the voltage $-U_{S2}$. The circuit 9 thus includes an amplifier 18-24 and a clamping circuit 27, 29, 30.

The emitter electrode of the transistor 28 with the signal J is connected in the sample-and-hold circuit 10 to a resistor 32 the other connection of which is connected to the source electrode s of a field effect transistor 33 of the n-channel type. The islated gate electrode of the transistor 33 is connected through a resistor 34 to a terminal to which the signal D with the sampling pulses according to FIG. 2 is applied. The drain electrode of the transistor 33 is connected to ground through an electrolytic capacitor 35 and is connected to the isolated gate electrode of a field effect transistor 36. The drain electrode of the transistor 36 of the n-channel type is connected to the terminal conveying the voltage $+U_{S2}$ and its source electrode s is connected through a resistor 37 to the terminal conveying the voltage $-U_{S2}$. The transistor 36 active as a source follower conveys the signal K shown in FIG. 2 on its source electrode. The circuit 10 includes a sampling circuit 32, 33, 34 with the transistor 33 which can conduct current in two directions and a hold circuit 35, 36 in which the use of a transistor 36 having an isolated gate electrode prevents the leakage of charge of the capacitor 35 through the transistor 36.

The source electrode s of the transistor 36 with the signal K is connected in the amplifier and clamping circuit 11 through a coupling capacitor 38 in series with a resistor 39 to a (+) input of an operational amplifier 40. The junction of capacitor 38 and resistor 39 is connected to the drain electrode of a field effect transistor 41 of the n-channel type whose source electrode s is connected to ground and whose isolated gate electrode is connected through a resistor 42 to a terminal to which the signal A with the clamping pulse according to FIG. 2 is applied. The (−) input of the operational amplifier 40 is connected to ground through a resistor 43 and through a feedback resistor 44 to the amplifier output. The output of the operational amplifier 40 conveys the signal L of FIG. 2. The circuit 11 includes the amplifier 40, 43, 44 and the clamping circuit 38, 41, 42 with the transistor 41 which can conduct current in two directions.

The output of the operational amplifier 40 with the signal L is connected in the gating circuit 12 to the source electrode s of a field effect transistor 45 of the n-channel type and can conduct current in two directions. The isolated gate electrode is connected through a resistor 46 to a terminal to which the signal C with the gating pulse of FIG. 2 is applied. The drain electrode of the transistor 45 is connected through a resistor 47 to the master contact of the change-over switch 17. Instead of being formed with the change-over switch 17 the gating circuit 12 may be formed with three field effect transistors 45 whose source electrodes s are connected to the output of the operational amplifier 40 while the drain electrode of each transistor 45 is connected through one of three resistors 47 to one of the three outputs of the gating circuit 12.

In FIG. 4 the gating circuit 12 is connected to the storage circuit with the limiter 13 and in this to the terminal of an electrolytic capacitor 48 present therein whose other terminal is connected to ground. The voltage-conveying terminal of the capacitor 48 conveys the signal M shown in FIG. 2. The gating circuit 12 and the storage circuit 13 jointly comprise an integrating circuit 47, 48 which is advantageous for the control to the optimum adjusting point $u_{30}$, $i_{30}$ described with reference to FIG. 3. If the integrating circuit 47, 48 were not present but only the capacitor 48, the voltage of the signal L passed on through the gating circuit 12 at the instant $t_7$ of FIG. 2 would instantaneously be impressed with the same value on the capacitor 48 and would also occur in the signal P according to FIG. 2. It follows that the displacement between two adjusting points around which the modulation is effected is greatly dependent on the value of the voltage in the signal L and hence on the location of the adjusting point on the $I_{g2,4}$–$U_{g3}$ characteristic of FIG. 3. It follows from the characteristic of FIG. 3 that the adjusting point displacement would be small from the adjusting point $u_{50}$ but due to the larger slope of the characteristic would become increasingly larger. When approaching the optimum adjusting point $u_{30}$ the adjusting point displacements may then become so large that this point is passed thereupon a large going back is effected again: the result is an oscillation about the optimum adjusting point $u_{30}$, $i_{30}$. The integrating circuit 47, 48 prevents such an oscillation because the signal integration has a reducing, smoothing action on the value of the adjusting point displacements as follows from a comparison of the signals L and M of FIG. 2.

In the storage circuit 13 the voltage-conveying terminal of the capacitor 48 is connected to the isolated gate electrode of a field effect transistor 49. The drain electrode of the transistor 49 of the n-channel type is connected to the terminal conveying the voltage $+U_{S2}$ and its source electrode s is connected through a resistor 50 to the terminal conveying the voltage $-U_{S2}$. The storage capacitor 48 constitutes with the transistor 49 operating as a source follower a store 48, 49 in the storage circuit 13 so that the control circuit 13, 14, 15 is active about a determined target erasing adjusting point when the gating circuit 12 is closed.

In the circuit 13 the source electrode s of the transistor 49 is connected to a resistor 51 the other connection of which is connected to the anode and the cathode of diodes 52 and 53, respectively. The cathode of the diode 52 is connected to a tap on a potentiometer 54 while the anode of the diode 53 is likewise connected to a potentiometer 55. The parallel connected potentiometers 54 and 55 are connected in series with a resistor 56 between ground and the terminal conveying the voltage $+U_{S2}$. The storage circuit 13 thus includes a limiter 52 to 56 which is further denoted by 57.

The limiter 57 in the storage circuit 13 has for its object to prevent the measuring and control circuit 6–15 from being active with a target erasing adjusting point on the characteristics of FIG. 3 for which there applies that $Ug_3$ is smaller than $u_1$ or $Ug_3$ is larger than $u_6$. For $Ug_3$ larger than $u_6$ there follows from the characteristics of FIG. 3 that the slope does not have a steep variation. The described modulation about a target erasing adjusting point located there only gives a small difference in the pulse voltages in the signal G and hence in the voltage of the signal L of FIG. 2; which for the circuit 6–15 involves the erroneous information of optimum erasing adjustment. Although they are not shown in FIG. 3 the characteristics for smaller voltages than $u_1$ ultimately also have a flat varying part.

The limiter 57 prevents the junction of the resistor 51 and the diodes 52 and 53 at which the signal N shown in FIG. 2 occurs from getting a higher or lower voltage than is adjusted at the potentiometer 54 ($u_1$) or ($u_6$). When a higher or lower voltage in the signal M occurs across the capacitor 48, the limiter 57 will be active. When switching on the measuring and control circuit 6–15 and the camera tube 1, the limiter 57 provides an initial voltage $u_6$ or $u_1$ in the signal N when upon switching on the capacitor 48 is not yet charged or not sufficiently charged or when it has got a too high charge due to a switch-on current pulse. As from the initial voltage ($u_6$) or ($u_1$) the control circuit 13, 14, 15 starts to operate in which the capacitor 48 is charged or discharged through the measuring circuit 9, 10, 11 and the gating circuit 12 in such a manner that the voltage thereacross is equal to the voltage $u_6$) or ($u_1$). Subsequently the described measuring and control circuit 6–15 becomes active with the adjusting point displacement.

The junction of the resistor 51 and the diodes 52 and 53 on which the signal N occurs is connected to the modulation signal generator 14 to a resistor 58 the other connection of which is connected to the base electrode of an npn transistor 59. The emitter electrode of the transistor 59 is connected to ground through a resistor 60 and is connected to two interconnected source electrodes s of two field effect transistors 61 and 62 of the n-channel type. The drain electrode of the transistor 61 is connected through a resistor 63 to the terminal conveying the voltage $-^hd S2$ and is connected through a resistor 64 to a terminal to which the signal A with a modulation pulse according to FIG. 2 is applied. The drain electrode of the transistor 62 is connected through a resistor 65 to the terminal conveying the voltage $+U_{S2}$ and is connected through a resistor 66 to a terminal in which the signal B with a modulation pulse according to FIG. 2 is applied. The collector electrode of the transistor 59 is connected through a resistor 67 to a terminal conveying a voltage $+U_{S3}$ and conveys the signal P of FIG. 2 to be applied to the modulator 15.

In the absence of the modulation pulses in the signals A and B the signal N of FIG. 2 occurs amplified and with the reversed phase in the signal P of FIG. 2; in this case the transistors 61 and 62 in the generator 14 are cut off. The modulation pulse in the signal A renders the transistor 61 connecting so that a lower positive voltage occurs on the emitter electrode and hence on the collector electrode of the transistor 59. The modulation pulse in the signal B renders the transistor 62 conducting so that a higher positive voltage occurs on the emitter electrode and hence on the collector electrode of the transistor 59. The signals N, A and B of FIG. 2 thus give the modulation signal P shown.

The collector electrode of the transistor 59 on which the modulation signal P of FIG. 2 occurs is connected in the pulse modulator 15 to the base electrode of an npn transistor 68. The collector electrode of the transistor 68 is connected to the terminal conveying the voltage $+U_{S2}$ and the emitter electrode is connected to the cathode of a zener diode 69. The anode of the zener diode 69 is connected through a resistor 70 to the terminal conveying the voltage $-U_{S2}$ and is connected to the anode of a diode 71. The cathode of the diode 71 is connected to the emitter electrode of an npn transistor 72 whose collector electrode is directly connected and whose base electrode is connected through a resistor 73 to the terminal conveying the voltage $U_{S1}$ and is furthermore connected to the output 7 and to a resistor 74. The other connection of the resistor 74 is connected to the anode of a diode 75 whose cathode is connected to the base electrode of the transistor 72 and to the collector electrode of an npn transistor 76. The emitter electrode of the transistor 76 is directly connected and the base electrode is connected to ground through a resistor 77. The base electrode of the transistor 76 is connected through a coupling capacitor 78 to a terminal to which the signal E with the pulses to be modulated according to FIG. 2 is applied.

In the absence of a pulse in the signal E the transistor 76 is cut off and the transistor 72 active as an emitter follower applies the voltage $+U_{S1}$ to the output 7 on which the signal Q of FIG. 2 occurs. A pulse in the signal E renders the transistor 76 conducting so that substantially the ground potential occurs at its collector electrode and the diode 75 is rendered conducting. The voltage at the emitter electrode of the transistor 72 and hence at the output 7 can, however, not become lower than the voltage at the anode of the diode 71 minus the threshold voltage present thereacross in the conducting condition. Since the instantaneous voltage in the signal P minus the base emitter voltage of the transistor 68 and the voltage across the zener diode 69 determines the voltage on the anode of the diode 71, the result at the output 7 is shown as in FIG. 2 for the signals P and Q. The emitter follower transistor 72 yields steep negative going pulse edges in the signal Q at the output 7 to which the lens electrode $g_3$ is connected as a capacitive load.

For the purpose of illustration some data as may occur in a practical embodiment of the circuit arrangement and the camera tube will now follow:

supply voltages: $U_{S1} = 250$ V, $I_{S2} = 12$ V, $U_{S3} = 35$ V pulse times: $T_H = 64$ μs, $T_{HS} = 53$ μs, $T_{HB} = 11$ μs, $T_{HBS} = 8$ μs, $T_{HBB} = 3$ μu pulse times signals D and F: 1.5 μs pulse times $T_V = 20$ ms, $T_{VS} = 18.72$ ms, $T_{VB} = 1.28$ ms pulse voltages in the signals A, B and C between −12 and + 12 V pulse voltages in the signals D, E and F between 0 and +6 V voltages at the camera tube: $U_C$: $T_{HS}$: 0V, $T_{HB}$: pulse height 0 to 15 V and adjustable $Ug_1$: $T_{HS}$: −45V.$T_{HBB}$: − 95.$T_{HBS}$: pulse weight 0 to 50 V adjustable $Ug_{2,4}$: + 250 V with a voltage decrease of approximately 0.3 V in $T_{HBS}$ $Ug_3$: + 250 V with $u_1$= +4V, $u_6$= +35V (FIG. 3) in $T_{HBS}$:

$Ug_5$: + 500 V
$Ug_6$: + 700 V
$Utg$: + 45 V
Integrating circuit (47, 48): resistor 48: 180 k Ω capacitor 48: 330 nF.

What is claimed is:

1. A circuit arrangement suitable for use with a television camera tube provided with a target plate an anti-comet tail electron gun, said gun having a cathode, a control electrode, anode electrodes and a lens electrode means for generating during line scan times and line flyback times an electron beam having different values of beam diameter, beam current intensity and potential upon impact on said target plate, a line period comprising the line scan time and a line blanking time comprising the line flyback time and a beam blanking time, said circuit arrangement comprising an input means for coupling to at least one of said anode electrodes present in the camera tube, a measuring circuit means for sampling a signal during the line flyback time coupled to said input means, said measuring circuit including a comparison circuit means for storing a sampled signal and for comparing two successively sampled and stored signals, and a control circuit coupled to the comparison circuit in the measuring circuit and having an output means for coupling to the lens electrode in the camera tube and for providing a changed lens adjustment during the line flyback times in case of unequal sampled signals in the comparison circuit for the purpose of eliminating the inequality.

2. A circuit arrangement as claimed in claim 1 wherein the control circuit comprises a modulator means for periodically controlling the voltage of a pulse applied during the line flyback time to the output means for supply to the lens electrode for lens displacement stepwise smaller and larger or larger and smaller relative to a voltage value which is given by the comparison circuit.

3. A circuit arrangement as claimed in claim 2, wherein the modulator applies said smaller or larger voltage of the pulse occurring during the line flyback time at the output means during a field scan time.

4. A circuit arrangement as claimed in claim 2, wherein the control circuit comprises a storage circuit having an input coupled to the comparison circuit in the measuring circuit and an output coupled to the modulator.

5. A circuit arrangement as claimed in claim 4, wherein the control circuit comprises a modulation signal generator coupled between the storage circuit and the modulator, and further comprising a pulse generator means for supplying successively occurring modulation pulses coupled to the modulation signal generator and coupled to the modulator for supplying the pulses to be modulated and occurring during the line flyback time.

6. A circuit arrangement as claimed in claim 5, wherein the storage circuit comprises a limiter means coupled to the modulation signal generator for conveying a signal located between a minimum and a maximum value.

7. A circuit arrangement as claimed in claim 4, further comprising a gating circuit coupled between said storage circuit and the output of the comparison circuit in the measuring circuit, and a pulse generator means for applying gating pulses to said gating circuit.

8. A circuit arrangement as claimed in claim 7, wherein the gating pulse from the pulse generator applied to the said gating circuit occurs during a field blanking time.

9. A circuit arrangement as claimed in claim 7, wherein the gating circuit enabled by the gating pulse and the storage circuit coupled thereto jointly comprise an integrating circuit.

10. A circuit arrangement as claimed in claim 1, wherein the measuring circuit comprises a first clamping circuit coupled to the input means of the circuit, and further comprising a pulse generator means for supplying a first clamping pulse occurring during a beam blanking time to said clamping circuit.

11. A circuit arrangement as claimed in claim 10, wherein said comparison circuit comprises a sample-and-hold circuit coupled to said clamping circuit and to the pulse generator means for receiving a sampling pulse occurring during a line flyback time.

12. A circuit arrangement as claimed in claim 11, wherein the said pulse generator provides the sampling pulses occurring during the line flyback times during two field scan times.

13. A circuit arrangement as claimed in claim 11, wherein said comparison circuit comprises a second clamping circuit coupled to the output of said sample and hold circuit and to the pulse generator for supplying a second clamping pulse, and said control circuit comprises a modulator means for providing a smaller or larger pulse voltage occurring during the line flyback time to the output means of the circuit arrangement, said second clamping pulse occurring when said pulse voltage occurs.

14. A circuit arrangement as claimed in claim 13, further comprising a gating circuit coupled between said storage circuit and said clamping circuit in the comparison circuit, the pulse generator means applying a gating pulse to the gating circuit occurring after the modulator in the control circuit has provided the said smaller and larger pulse voltage value.

15. A circuit arrangement as claimed in claim 1, wherein the input means of the circuit comprises a changeover switch having a plurality of selection contacts and a master contact coupled to the measuring circuit, said selection contacts being each connectable to a different camera tube, the gating circuit comprising a change-over switch having a master contact and a plurality of selection contacts, the master contact being coupled to the measuring circuit and one of the selection contacts being coupled to the control circuit, which control circuit includes a storage circuit.

16. A circuit arrangement as claimed in claim 1, further comprising said camera tube, the input means of the circuit arrangement being coupled to that one of said anode electrodes in the camera tube which is provided near the lens electrode in the electron gun.

17. A circuit arrangement as claimed in claim 1, further comprisinsg said camera tube, the input means of the circuit arrangement being coupled to that one of said anode electrodes in the camera tube which is provided near the target plate.

18. A circuit arrangement as claimed in claim 1, further comprising a plurality of camera tubes, means for alternately coupling said measuring circuit to the camera tubes, each camera tube having a control circuit and a storage circuit, and means for alternately coupling said control and storage circuits to the measuring circuit.

19. A method for eliminating the comet tail effect from a television camera tube, said method comprising periodically sampling a video signal during line flyback times, storing a sampled signal, comparing two successively sampled and stored signals, and changing the focus of the lens electrode of said tube during line flyback times upon said compared signals being unequal.

* * * * *

UNITED STATES PATENT AND TRADEMARK OFFICE
CERTIFICATE OF CORRECTION

PATENT NO. : 3,931,466
DATED : January 6, 1976
INVENTOR(S) : WOUTER VAN DEN BERG It is certified that error appears in the above-identified patent and that said Letters Patent are hereby corrected as shown below:

Column 12, line 51, "$I_{S2}$" should be --$U_{S2}$--;

line 61, "OV" should be --oV--;

line 63, "95.$T_{HBS}$: pulse weight" should be --95V. $T_{HBS}$: pulse height--;

Claim 1. line 2, after "plate" it should be --and--.

Signed and Sealed this second Day of August 1977

[SEAL]

Attest:

RUTH C. MASON
*Attesting Officer*

C. MARSHALL DANN
*Commissioner of Patents and Trademarks*